United States Patent
Syed et al.

(10) Patent No.: US 10,681,596 B2
(45) Date of Patent: *Jun. 9, 2020

(54) NEIGHBOR LIST MANAGEMENT AND CONNECTION CONTROL IN A NETWORK ENVIRONMENT

(71) Applicant: Time Warner Cable Enterprises LLC, St. Louis, MO (US)

(72) Inventors: Hussain Zaheer Syed, Ashburn, VA (US); Praveen C. Srivastava, Ashburn, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,417

(22) Filed: Feb. 20, 2019

(65) Prior Publication Data

US 2019/0182724 A1    Jun. 13, 2019

Related U.S. Application Data

(63) Continuation of application No. 14/698,487, filed on Apr. 28, 2015, now Pat. No. 10,244,438.

(51) Int. Cl.
*H04W 36/00* (2009.01)
*H04W 84/12* (2009.01)

(52) U.S. Cl.
CPC ... *H04W 36/0038* (2013.01); *H04W 36/0061* (2013.01); *H04W 36/0083* (2013.01); *H04W 84/12* (2013.01)

(58) Field of Classification Search
CPC ......... H04W 36/0038; H04W 36/0061; H04W 36/0083
See application file for complete search history.

(56) References Cited

U.S. PATENT DOCUMENTS

| | | | |
|---|---|---|---|
| 2006/0133338 | A1 | 6/2006 | Reznik et al. |
| 2006/0193299 | A1 | 8/2006 | Winget et al. |
| 2008/0280621 | A1 | 11/2008 | Soomro et al. |
| 2013/0040603 | A1 | 2/2013 | Stahlberg et al. |
| 2014/0177611 | A1 | 6/2014 | Corrales |
| 2014/0301363 | A1 | 10/2014 | Han |
| 2016/0044591 | A1 | 2/2016 | Pao et al. |

*Primary Examiner* — Gbemileke J Onamuti
(74) *Attorney, Agent, or Firm* — Armis IP Law, LLC

(57) ABSTRACT

A first wireless access point receives communications from multiple candidate wireless access points in a monitored region in which the first wireless access point resides. The communications indicate presence of the multiple candidate wireless access points in the monitored region. A processing resource associated with the first wireless access point processes the communications to identify which of the multiple candidate wireless access points are trusted wireless access points belonging to a network in which the first wireless access point resides. To facilitate a wireless link handoff from the given wireless access point to one of the trusted wireless access points, the given wireless access point provides notification of identities of the trusted wireless access points to a communication device in communication with the given wireless access point. The communication device selects one of the trusted wireless access points in which to handoff the respective wireless communication link.

27 Claims, 9 Drawing Sheets

DATA
170

| WIRELESS ACCESS POINT | SSID | BSSID | VENDOR INFO. | RSSI | COMMN. REC'D FROM DIRECTION | PRIORITY LEVEL |
|---|---|---|---|---|---|---|
| 105-2 | SSID#2 = "TWC-WIFI" | BSSID#2 = AA23 | X29 | 85 | 0 | 1 |
| 105-3 | SSID#3 = "TWC-WIFI" | BSSID#3 = AA45 | X29 | 60 | 180 | 5 |
| 105-4 | SSID#4 = "TWC-WIFI" | BSSID#4 = B653 | S32 | 90 | 225 | 3 |
| 105-5 | SSID#5 = "TWC-WIFI" | BSSID#5 = 2455 | S45 | 65 | 90 | 4 |
| 105-6 | SSID#6 = "XYZ-WIFI" | BSSID#6 = 3321 | X29 | 65 | 315 | 2 |

FIG. 2

NEIGHBOR LIST MANAGEMENT AND CONNECTION CONTROL IN A NETWORK ENVIRONMENT

RELATED APPLICATION

This application is a continuation of earlier filed U.S. patent application Ser. No. 14/698,487 entitled "NEIGHBOR LIST MANAGEMENT AND CONNECTION CONTROL IN A NETWORK ENVIRONMENT," filed on Apr. 28, 2015, the entire teachings of which are incorporated herein by this reference.

BACKGROUND

Conventional wireless networks typically include multiple communication resources (such as one or more WiFi™ base stations) facilitating wireless communications with one or more respective mobile communication devices. For example, a conventional wireless network may include: a first base station providing wireless coverage to a first region in a network environment; a second base station providing wireless coverage to a second region in the network environment; etc.

Each of the wireless base stations may be part of the same wireless network providing access to a corresponding remote network such as the Internet. Via communications through a selected one of the multiple base stations, a respective user of the mobile communication device is able to wirelessly communicate through the selected wireless access point over the Internet.

In certain instances, the wireless base stations may support handoffs from one base station to another. This typically requires settings of the wireless base stations to be synchronized to some extent.

According to conventional techniques, and the IEEE 802.11k standard, a wireless access point can be configured to collect information to discover one or more available access points to hand off a respective client device. The access point can be configured to notify a mobile communication device of availability of different access points in a network environment. Each communication device in a wireless network normally connects to a respective Access Point (AP) that provides the strongest signal when establishing a respective communication link. Depending on the number and geographic locations of the subscribers, this arrangement can sometimes lead to excessive demand on one particular access point and underutilization of other access points, resulting in degradation of overall network performance.

In a conventional network conforming to 802.11k, if the access point providing the strongest signal to a respective mobile communication device is loaded to its full capacity, the wireless device is handed off to one of the underutilized wireless access points. Even though the signal may be weaker with the new wireless access point, the overall throughput of the wireless network is greater because more efficient use is made of the network resources.

In accordance with certain conventional wireless handoffs, a wireless access point can initially determine that a respective client is moving away from it. To initiate a wireless handoff, the access point informs the client device to prepare to switch to communicating with a new access point. As part of the handoff protocol, the client device then requests the wireless access point for a list (i.e., neighbor list) of nearby wireless access points in a vicinity of the given wireless access point to which the communication device is connected. As mentioned above, the given wireless access point monitors the immediate area for presence of other wireless access points and produces a respective neighbor list. The given wireless access point then forwards the respective neighbor list of nearby wireless access points to the client device. The client device then selects an access point from the neighbor list and establishes a new wireless link with the selected wireless access point in the neighbor list.

BRIEF DESCRIPTION OF EMBODIMENTS

Conventional handoff techniques and producing a respective neighbor list of available wireless access points in a given monitored region suffer from deficiencies. For example, as discussed above, a neighbor list generated in accordance with conventional techniques can include identities of all wireless access point neighbors present in a region, regardless of whether the wireless access points are detected as being desirable wireless access points in which to perform a handoff.

Embodiments herein deviate with respect to conventional techniques of producing and distributing neighbor lists of available wireless access points.

For example, in accordance with one embodiment, assume that a wireless network includes multiple wireless access points capable of providing a given mobile communication device wireless connectivity to a respective network such as the Internet. A first wireless access point in the respective network of multiple wireless access points currently supports connectivity with a communication device. Assume that the communication device experiences wireless congestion while communicating with the first wireless access point. In accordance with embodiments herein, the first wireless access point can be configured to monitor the nearby region for presence of candidate wireless access points in which to handoff a current wireless connection with the mobile communication device to a second wireless access point in the immediate area. The second wireless access point may be able to provide the given mobile communication device better connectivity (such as better wireless communication bandwidth).

In contrast to conventional techniques of merely forwarding a neighbor list of every available wireless access point in a region to the mobile communication device, the first wireless access point receives communications from multiple candidate wireless access points in the monitored region in which the first wireless access point resides. The communications indicate presence of the multiple candidate wireless access points in the monitored region. Rather than merely forwarding a neighbor list of all access points present in a network environment, embodiments herein include producing a filtered list of verified (trusted) wireless access points in which to perform a handoff.

More specifically, in one embodiment, the first wireless access point or other suitable resource processes communications (SSID, BSSID, vendor information, etc.) received from the candidate wireless access points in a regarding to identify which of fewer-than-all of the multiple candidate wireless access points are trusted wireless access points for performing a hand off. Subsequent to filtering out non-trusted wireless access points by identifying which of the candidate wireless access points are trusted to support communications with the client device, the first wireless access point (or other suitable resource) transmits notification (such as a filtered wireless access point neighbor list) including identities of the trusted wireless access points to a mobile communication device currently in communication with the first wireless access point. The mobile communication device then selects, from the neighbor list of trusted candidate wireless access points, a respective wireless access point in which to perform a respective handoff from the first wireless access point to a wireless access point from the filtered neighbor list.

In accordance with further embodiments, in furtherance of producing the neighbor list of trusted wireless access points, the first wireless access point can be configured to forward information (such as BSSID, SSID, vendor information, etc.) collected from the candidate wireless access points to a controller resource (such as a remote resource) that manages multiple wireless access points in a monitored region. The controller resource analyzes the information received from the first wireless access point to perform a validation function to identify which of the fewer-than-all candidate wireless access points is a trusted resource. After producing the filtered neighbor list, the controller resource forwards the neighbor list of trusted resources to the first wireless access point.

In accordance with yet further embodiments, the first wireless access point can be configured to provide an indication of which of the trusted wireless access points is best suited to provide the mobile communication device wireless access. For example, during collection of information from each of the candidate wireless access points, the first wireless access point can be configured to identify a direction as well as signal strength of respective communications received from each of the candidate wireless access points. The first wireless access point (or other suitable resource) subsequently uses parameters such as the direction and signal strength information (from previous communications) to identify which of the multiple identified trusted wireless access points is best suited to support a handoff. The mobile communication device then is able to make a good selection of which of the trusted wireless access points to perform a handoff, Accordingly, embodiments herein provide a level of security and/or filtering over conventional techniques. That is, in contrast to conventional techniques in which a conventional neighbor list potentially includes malicious (or non-trusted) wireless access points, a respective client device according to embodiments herein receives a filtered neighbor list. The filtered neighbor list includes identities of validated (trusted) wireless access points that are suitable to perform a respective safe wireless link hand off. As previously discussed, in certain instances, the neighbor list of validated wireless access points can be modified to specify which of the multiple validated wireless access points are best-suited to support the handoff.

These and other more specific embodiments are disclosed in more detail below.

Note that any of the resources as discussed herein can include one or more computerized devices, controllers, set top boxes, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. In accordance with one embodiment, the instructions, when executed by computer processor hardware, cause the computer processor hardware (such as in a wireless access point) to: receive communications from multiple candidate wireless access points in a monitored region in which a given wireless access point resides, the communications indicating presence of the multiple candidate wireless access points in the monitored region; process the communications to identify which of the multiple candidate wireless access points are trusted wireless access points; and provide notification (such as a neighbor list) of identities of the trusted wireless access points to a communication device in communication with the given wireless access point.

Another embodiment herein includes a computer readable storage medium and/or system having instructions stored thereon. The instructions, when executed by computer processor hardware, causes the computer processor hardware (such as in a mobile communication device) to: receive communications from multiple candidate wireless access points in a monitored region in which a given wireless access point resides, the communications indicate presence of the multiple candidate wireless access points in the monitored region; process the communications received from the multiple candidate wireless access points to identify which of the multiple candidate wireless access points purports to be part of a network in which the given wireless access point belongs; and for the multiple candidate wireless access points that purport to be part of the network to which the given wireless access point belongs, utilize unique identifier values assigned to the multiple candidate wireless access points to identify which of the candidate wireless access points is a trusted wireless access point belonging to the network.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As further discussed herein, techniques herein are well suited to automatically update network configuration settings associated with communication resources disposed in a respective subscriber domain. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 2 is an example diagram illustrating data collected from multiple wireless access points according to embodiments herein.

Figure 1:
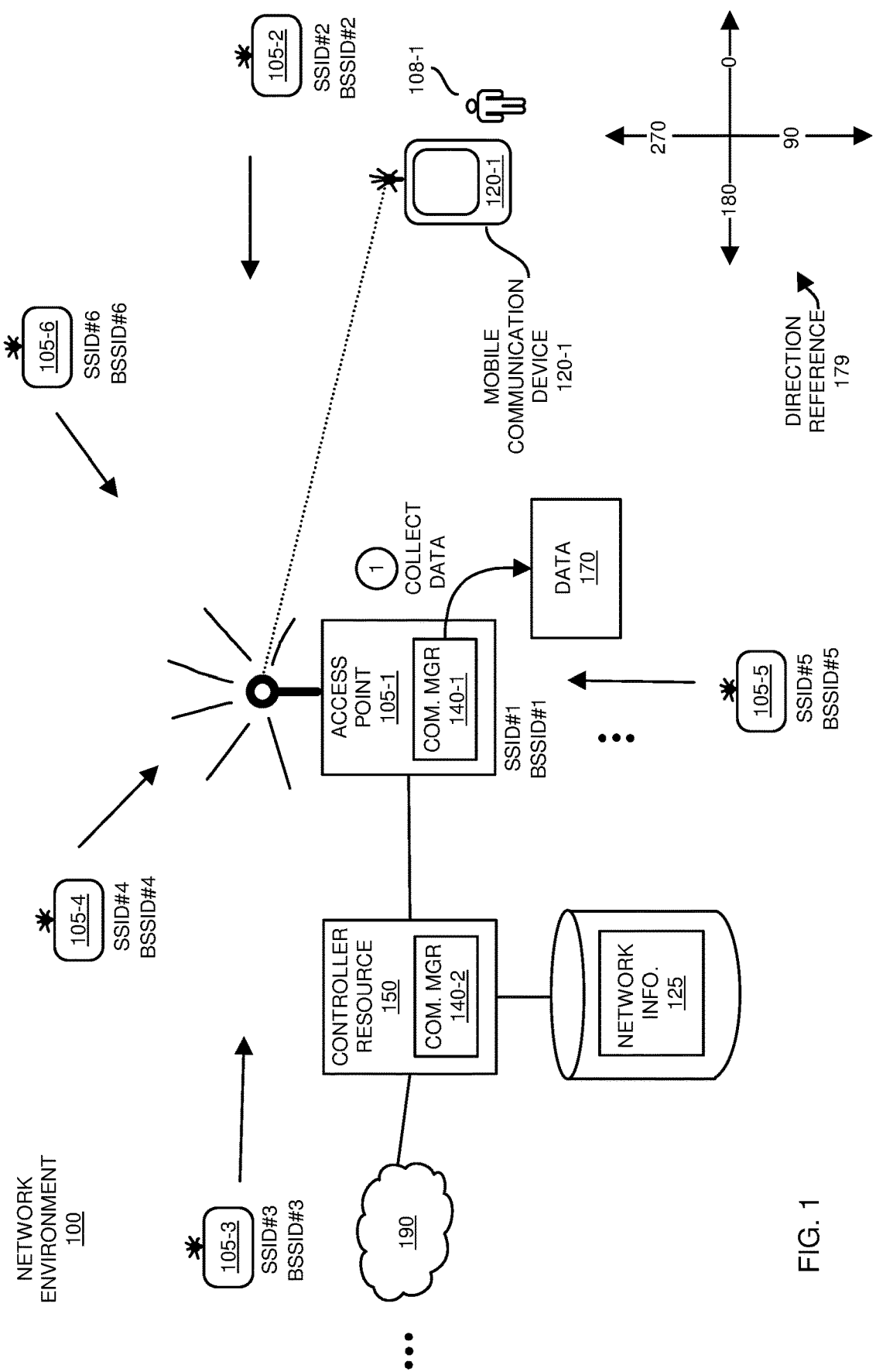
FIG. 1 is an example diagram illustrating a network environment and collection of data to produce a neighbor list according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In general, according to one embodiment, a first wireless access point receives communications from multiple candidate wireless access points in a monitored region in which the first wireless access point resides. The communications indicate presence of the multiple candidate wireless access points in the monitored region. A processing resource processes the communications to identify which of the multiple candidate wireless access points are trusted wireless access points belonging to a network in which the first wireless access point resides. To facilitate a wireless link handoff from the given wireless access point to one of the trusted wireless access points, the given wireless access point or other suitable resource provides notification (such as a filtered neighbor list) of identities of the trusted wireless access points to a communication device in communication with the first wireless access point. The communication device (or other suitable resource) selects one of the trusted wireless access points in which to handoff the respective wireless communication link.

Now, more specifically, FIG. 1 is an example diagram illustrating a network environment according to embodiments herein.

As shown, network environment 100 includes one or more wireless access points 105 including wireless access point 105-1, wireless access point 105-2, wireless access point 105-3, wireless to access point 105-4, wireless access point 105-5, wireless access point 105-6, etc. The one or more wireless access points 105 in the network environment 100 provides one or more users operating respective mobile communication devices 150 access to network 190 (which may include the Internet as well as any other number of networks).

Further in this example embodiment, assume that the mobile communication device 120-1 operated by a respective user 108-1 establishes a respective wireless communication link with the wireless access point 105-1. As its name suggests, the controller resource 150 controls access to remote network 190 such as the Internet. For example, mobile communication device 120-1 transmits communications to the wireless access point 105-1 over a respective wireless communication link. The wireless access point 105-1 forwards the communications from the mobile communication device 120-1 through controller resource 150 to network 190.

In a reverse direction, the wireless access point 105-1 receives communications directed to the mobile communication device 120-1 from network 190. The wireless access point 105-1 conveys the communications over the respective wireless communication link to mobile communication device 120-1.

Note that each of the wireless access points can belong to the same or different sub-networks within the network environment 100. Each of the sub-networks can be provided and managed by a same or different service provider entity.

Additionally, each of the wireless access points 105 can be configured to share use of the same RF (Radio Frequency) spectrum in network environment 100 to communicate with respective one or more target mobile communication devices.

Network environment 100 and corresponding wireless access point 105 can be configured to support short-range or a long-range communications in accordance with any suitable wireless protocol. In one non-limiting example embodiment, each of the wireless access points 105 supports wireless communications in accordance with any of one or more WiFi™ protocols.

To notify resources (such as mobile communication devices, wireless access points, etc.) of the presence and availability of respective wireless access points 105, each of the wireless access points repeatedly (over time) generates and broadcasts communications (such as wireless beacons) in network environment 100.

In one embodiment, the signals such as beacons include an SSID (name or unique identifier value) assigned to the respective wireless access point transmitting the communication.

Based upon receipt of communications from the multiple wireless access points in a nearby vicinity, the wireless access point 105-1 can be configured to generate a neighbor list of wireless access points that are able to communicate with the wireless access point 105-1. The neighbor list indicates wireless access points that are within communication range of the wireless access point 105-1.

In certain instances, subsequent to learning of a presence of a particular wireless access point in its vicinity, the wireless access point 105-1 can initiate communications with a particular wireless access point to retrieve additional information if desired. The additional information can include a BSSID (such as a unique network address) assigned to the respective wireless access point, vendor information indicating a vendor to which the particular wireless access point is assigned, etc.

More specifically, as shown in this example embodiment, the communication manager 140-1 and wireless access point 105-1 receives beacon communications from each of multiple wireless access points 105-2, 105-3, 105-4, 105-5, and 105-6, residing in network environment 100. Based upon the received communications, either from beacons received from the wireless access points or responses to queries by the wireless access point 105-1, the collection manager 140-1 produces data 170 as further shown and discussed in FIG. 2.

FIG. 2 is an example diagram of collected data according to embodiments herein. In general, as further discussed below, the wireless access point 105-1 (such as via communication manager 140-1) receives communications from multiple candidate wireless access points (such as wireless access points 105-2, 105-3, 105-4, 105-5, and 105-6) in a monitored region in which wireless access point 105-1 resides. The communications indicate presence and/or attributes of the multiple candidate wireless access points in the monitored region.

Based on the communications received from the multiple wireless access points, the wireless access point 105-1 produces set of data 170 indicating attributes of the candidate wireless access points.

The data 170 can be configured to include any suitable type of information. As a more specific example, as shown, the data 170 can be configured to include information such as SSID information (e.g., a name of a network in which the respective wireless access point purports to be a long) received from the respective wireless access point, a BSSID value (e.g., a MAC address assigned to the respective wireless access point), vendor information indicating a vendor associated with the respective wireless access point, received signal strength information (such as RSSI) indicating a strength of the wireless communications received from the respective wireless access point at the wireless access point 105-1, a direction from which the wireless communications are received from the respective wireless access point, etc.

In this example embodiment, assume that FIG. 1 illustrates a physical direction from which the communications from the candidate wireless access points are received in accordance with the angular direction reference 179.

In such an instance, the communication manager 140-1 of the wireless access point 105-1 detects that the communications received from wireless access point 105-2 are received at an angle of 0° (with respect to angular direction reference 179); communication manager 140-1 detects that the communications received from wireless access point 105-3 are received at an angle of 180°; communication manager 140-1 detects that communications received from wireless access point 105-4 are received an angle of 225°; communication manager 140-1 detects that the communications received from wireless access point 105-5 are received an angle of 90°; and communication manager 140-1 detects that the communications received from wireless access point 105-6 are received at an angle of 315°. The communication manager 140-1 populates data 170 to keep track of this information.

Accordingly, via the direction of receiving respective communications, the communication manager 140-1 is able to identify a general location of each of the candidate wireless access points in network environment 100.

The strength of received wireless signals from the wireless access points also may indicate a relative distance of the respective remote wireless access point from the wireless access point 105-1.

As will be discussed later in the specification, if desired, the communication manager 140-1 of the wireless access point 105-1 can be configured to generate priority information indicating a priority ordering indicating which of the multiple wireless access points (including wireless access points 105-2, 105-3, 105-4, 105-5, and 105-6) is best suited to handle a handoff of the wireless communication link between the mobile communication device 120-1 and the wireless access point 105-1. The priority information can be based on information such as: a direction of the mobile communication device 120-1 with respect to the wireless access point 105-1, a direction of each of the respective candidate wireless access points, signal strengths of communications received from the candidate wireless access points, etc.

Figure 3:
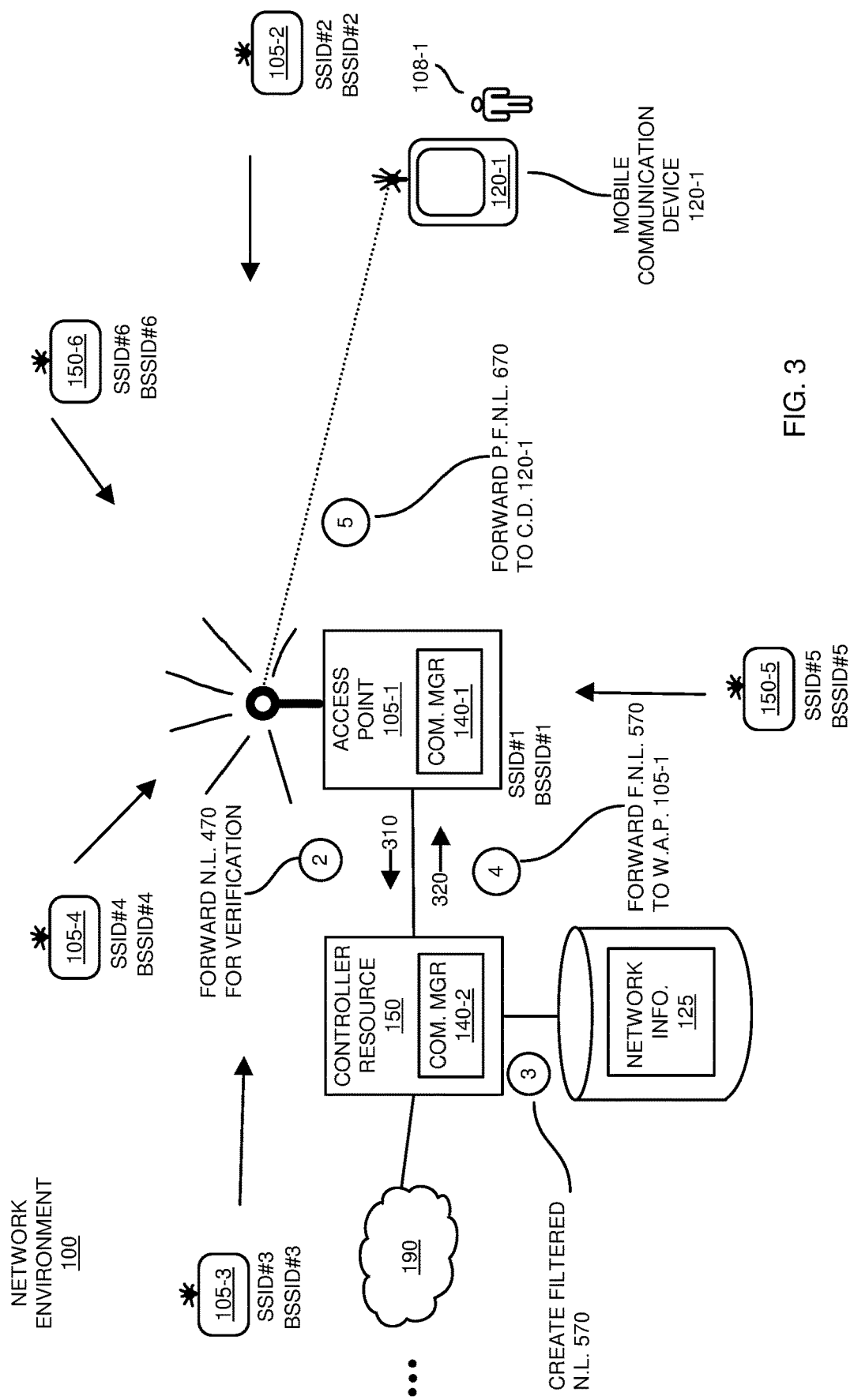
FIG. 3 is an example diagram illustrating operations of validating wireless access points and forwarding of a prioritized filtered neighbor list to a mobile communication device according to embodiments herein.

FIG. 3 is an example diagram illustrating communications 160-1 according to embodiments herein.

Subsequent to collecting information associated with each of the wireless access points 105, the wireless access point 105-1 uses the data 170 to produce a respective neighbor list 470 of candidate wireless access points in which to potentially perform a respective wireless communication link handoff.

Figure 4:
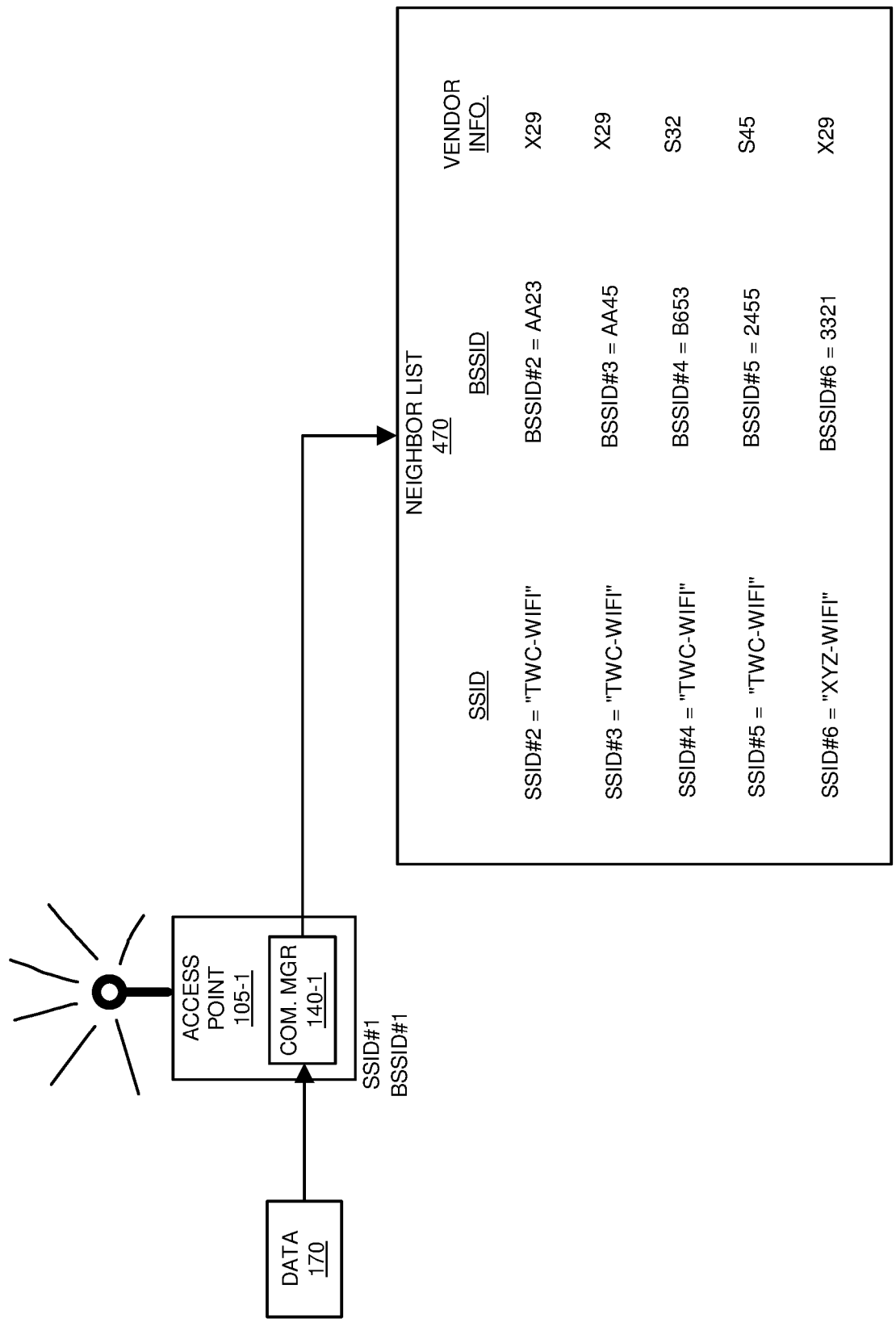
FIG. 4 is an example diagram illustrating generation of a respective neighbor list of candidate wireless access points according to embodiments herein.

Generation of the neighbor list 470 is more specifically shown in FIG. 4. In the example embodiment of FIG. 4, for each of multiple candidate wireless access points, the communication manager 140-1 specifies information such as the SSID, the BSSID, vendor information, etc., associated with candidate wireless access points that are detected as being present in a vicinity of wireless access point 105-1.

In one embodiment, the communication manager 140-1 produces the neighbor list 470 based upon filter criteria such as an SSID assigned to the nearby wireless access points. As an illustrative example, the mobile communication device 120-1 may wish to connect to network services provided by service provider TWC-WIFI. Each of the candidate wireless access points 105-2, 105-3, 105-4, and 105-5, may purport to belong to the respective service provider that provides TWC-WIFI services. However, as previously discussed, one or more of the respective candidate wireless access points may be operated by a malicious party attempting to lure the mobile communication device 120-1 to perform a respective handoff.

Referring again to FIG. 3, to avoid handing off a respective wireless communication link of the mobile communication device 120-1 to a non-trusted wireless access point, the wireless access point 105-1 forwards the neighbor list 470 to the communication manager 140-2 of controller resource 150 for verification.

In general, the communication manager 140-2 of the controller resource 150 processes the neighbor list 470 to identify which of the multiple candidate wireless access points in the neighbor list 470 are trusted wireless access points in which to allow a handoff of a respective wireless communication link between the mobile communication device 120-1 and the wireless access point 105-1. Using network information 125, the communication manager 140-2 applies a filter function to derive filtered neighbor list 570 from the received neighbor list 470. This is more particularly shown in FIG. 5.

Figure 5:
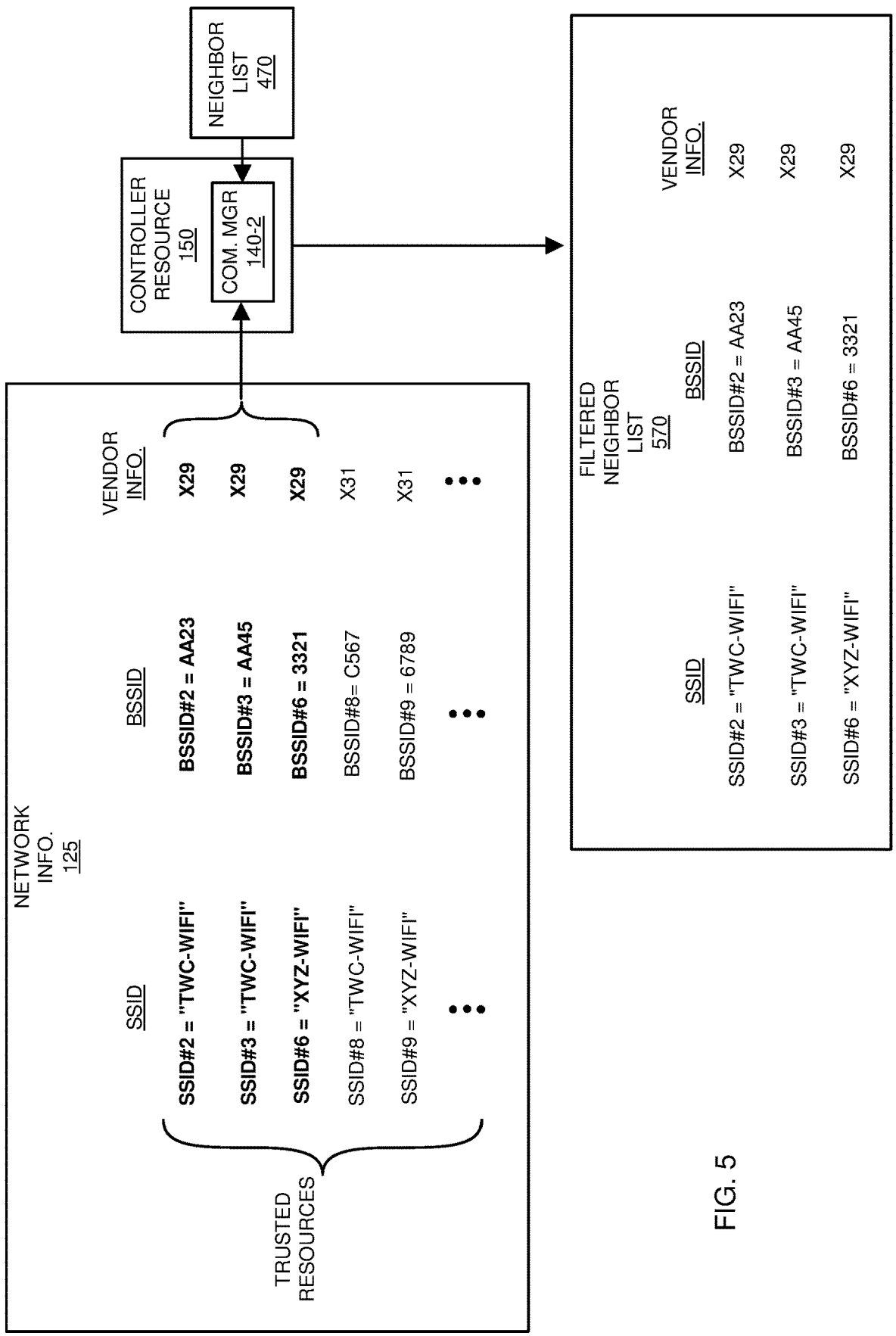
FIG. 5 is an example diagram illustrating validation of candidate wireless access points to produce a filtered neighbor list according to embodiments herein.

FIG. 5 is an example diagram illustrating generation of a filtered neighbor list according to embodiments herein. As shown, and as previously discussed, the communication manager 140-2 in controller resource 150 receives neighbor list 470 from the wireless access point 120-1. Network information 125 indicates which communication resources are to be trusted.

Using the network information 125, the communication manager 140-2 determines which of the candidate wireless access points in the neighbor list 470 are trusted resources in which to allow a respective handoff. More specifically, in one embodiment, the communication manager 140-2 detects that the wireless access point 105-2 (purporting to be part of the TWC-WIFI network) assigned SSID #2=TWC-WIFI, BSSID #2=AA23, and vendor information X29 in the neighbor list 470 is a trusted resource because network information 125 indicates that a respective wireless access point assigned such credentials is a trusted resource. In other words, because the credentials provided by the wireless access point 105-2 match those in previously stored network information 125, the communication manager 140-2 includes the wireless access point 105-2 in the filtered neighbor list 570 of trusted wireless access points.

During further processing of the received neighbor list 470, the communication manager 140-2 detects that the wireless access point 105-3 (purporting to be part of the TWC-WIFI network) assigned SSID #3=TWC-WIFI, BSSID #3=AA45, and vendor information X29 in the neighbor list 470 is a trusted resource because network information 125 indicates that a respective wireless access point assigned such credentials is a trusted resource. In other words, because all or a portion of the credentials provided by the wireless access point 105-3 match those in previously stored network information 125 of trusted resources, the communication manager 140-2 includes the wireless access point 105-3 in the filtered neighbor list 570 of trusted wireless access points.

During further processing of the received neighbor list 470, the communication manager 140-2 detects that the wireless access point 105-4 (purporting to be part of the TWC-WIFI network) assigned SSID #4=TWC-WIFI, BSSID #4=B653, and vendor information S32 in the neighbor list 470 is not a trusted resource because network information 125 does not indicate that a respective wireless access point assigned such credentials is a trusted resource. In other words, because all or a portion of the credentials provided by the wireless access point 105-4 do not match credentials of trusted resources as specified by network information 125 of trusted resources, the communication manager 140-2 does not include the wireless access point 105-4 in the filtered neighbor list 570 of trusted wireless access points.

During further processing of the received neighbor list 470, the communication manager 140-2 detects that the wireless access point 105-5 (purporting to be part of the TWC-WIFI network) assigned SSID #5=TWC-WIFI, BSSID #5=2455, and vendor information S45 in the neighbor list 470 is not a trusted resource because network information 125 does not indicate that a respective wireless access point assigned such credentials is a trusted resource. In other words, because all or a portion of the credentials provided by the wireless access point 105-5 do not match credentials stored network information 125 of trusted resources, the communication manager 140-2 does not include the wireless access point 105-5 in the filtered neighbor list 570 of trusted wireless access points.

During further processing of the received neighbor list 470, the communication manager 140-2 detects that the wireless access point 105-6 (purporting to be part of the TWC-WIFI network) assigned SSID #6=XYZ-WIFI, BSSID #6=3321, and vendor information X29 in the neighbor list 470 is a trusted resource because network information 125 indicates that a respective wireless access point assigned such credentials is a trusted resource. In this example embodiment, assume that the service provider XYZ-WIFI has a business partnership with TWC-WIFI, allowing handoffs between the different networks. In such an instance, the credentials for a station 105-6 are included in the network information 125 of trusted resources. In this instance, because all or a portion of the credentials provided by the wireless access point 105-6 match those in previously stored network information 125 of trusted resources, the communication manager 140-2 includes the wireless access point 105-3 in the filtered neighbor list 570 of trusted wireless access points.

In this manner, for the multiple candidate wireless access points that purport to be part of the network (TWC-WIFI) to which the wireless access point belongs, the communication manager 140 utilizes unique identifier values (such as BSSID information, vendor information, etc.) assigned to the multiple candidate wireless access points to identify which of all or fewer-than-all of the candidate wireless access points is a trusted wireless access point belonging to the TWC-WIFI network.

Referring again to FIG. 3, subsequent to creating the filtered neighbor list 570, the communication manager 140-2 of controller resource 150 forwards the filtered neighbor list 570 to the wireless access point 105-1. As further discussed below, via the filtered neighbor list 570, the communication manager 140-1 in wireless access point 105-1 determines which of the multiple candidate wireless access points is a trusted resource in which to allow a respective handoff.

Figure 6:
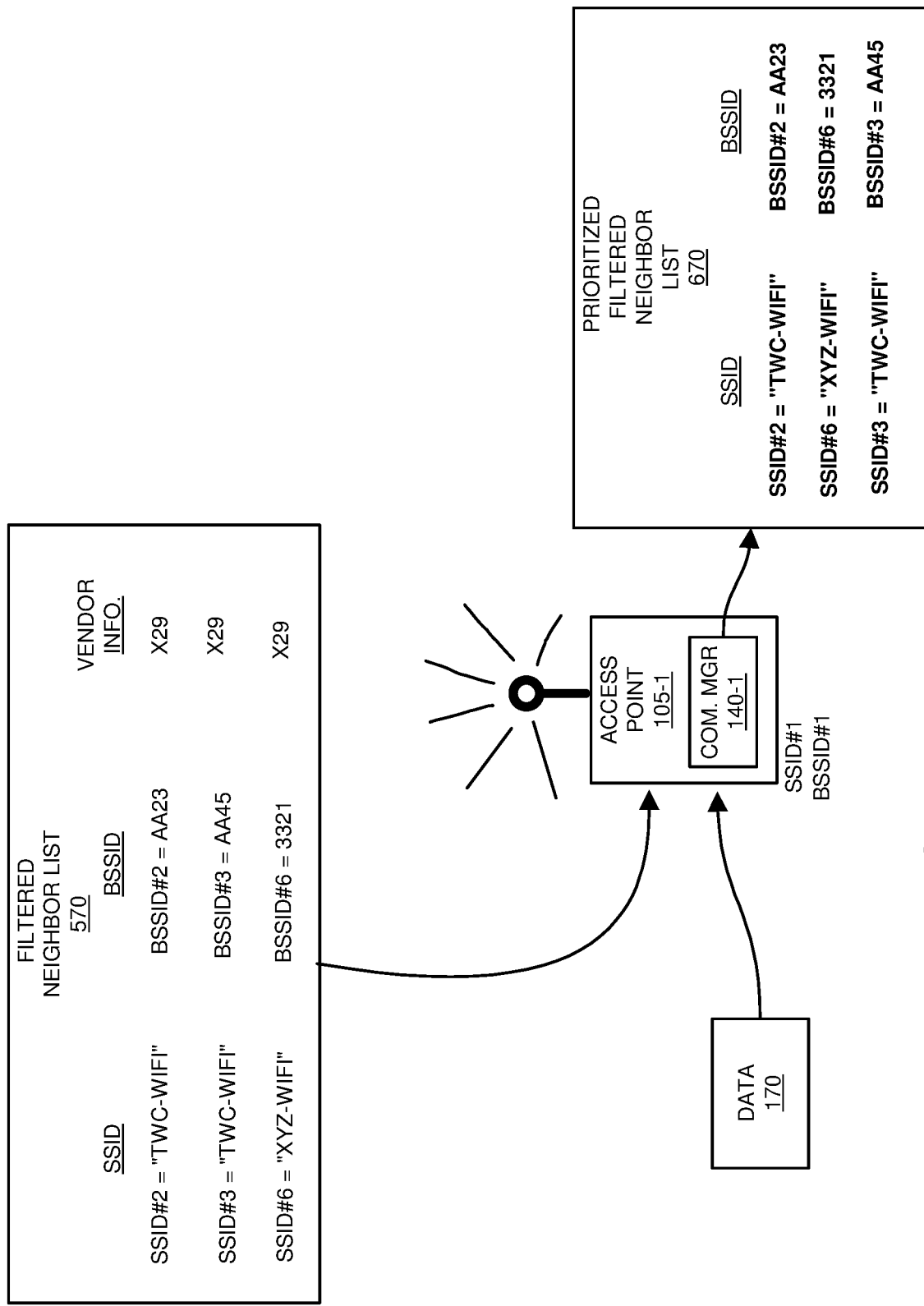
FIG. 6 is an example diagram illustrating processing of the received filtered neighbor lists to produce a prioritized filtered neighbor list according to embodiments herein.

FIG. 6 is an example diagram illustrating generation of a prioritized filtered neighbor list according to embodiments herein.

As shown, using the filtered neighbor list 570, the communication manager 140-1 identifies which of the multiple wireless access points is a trusted resource in which to allow a respective wireless handoff. To generate a respective prioritized list, the communication manager 140-1 analyzes information such as signal strength and a direction from which communications are received from the trusted wireless access points to determine a respective priority level indicating which of the trusted wireless access points is best-suited to perform the handoff.

For example, via communications between the wireless access point 105-1 and the mobile communication device 120-1, the communication manager 140-1 identifies a direction as well as signal strength of communications received from the mobile communication device 120-1. In this example embodiment, the communication manager 140-1 detects that the mobile communication device 120-1 is received at an angle of 15° (in accordance with direction reference 179 in FIG. 1). The wireless access point most suited to handle the handoff typically will also be located in a same direction in which the mobile communication device 120-1 resides with respect to the wireless access point 105-1.

Accordingly, based upon an analysis of attributes such as signal strength information and direction information (see data 170) for each of the trusted wireless access points in the filtered neighbor list 570, the communication manager 140-1 produces the prioritized filtered neighbor list 670 to indicate that the wireless access point 105-2 assigned BSSID=AA23 is best suited to perform a respective handoff because communications received from the wireless access point 105-2 are relatively strong and because such communications are received in approximately the same direction as communications from mobile communication device 120-1.

The communication manager 140-1 produces the prioritized filtered neighbor list 670 to indicate that the wireless access point #6 assigned BSSID=3321 is next best wireless access point in which to perform a respective handoff because communications received from the wireless access point 105-3 are relatively strong and received in approximately the same direction as communications received from mobile communication device 120-1.

The communication manager 140-1 produces the prioritized filtered neighbor list 670 to indicate that the wireless access point #3 assigned BSSID=AA45 is least suited to perform a respective handoff because communications received from the wireless access point 105-3 are relatively weak and received in an opposite direction as communications received from mobile communication device 120-1.

Accordingly, the communication manager 140-1 orders the wireless access points in the prioritized filtered neighbor list 670 depending upon one or more factors such as directions of receiving communications from the communication device 120-1, received signal strength of communications from the wireless access points, etc.

Subsequent to producing the prioritized filtered neighbor list 670, the communication manager 140-1 forwards the prioritized filtered neighbor list 670 to the communication device 120-1.

In one embodiment, the mobile communication device 120-1 selects from the prioritized filtered neighbor list 670 in which to initiate a respective handoff. For example, assume that the mobile communication device 120-1 selects the wireless access point 105-2 in which to perform a respective handoff of the communication link. In such an instance, the mobile communication device 120-1 communicates with the wireless access point 105-2, requesting the handoff.

If the wireless access point 105-2 accepts the handoff request, if needed, the controller resource 150 or other suitable resource initiates forwarding of cache data (associated with the wireless communication link between the wireless access point 105-1 and the mobile communication device 120-1) to the wireless access point 105-2 in order to enable a seamless link handoff from the wireless access point 105-1 to the wireless access point 105-2.

Thus, a trusted wireless access point to which a handoff is performed may not currently cache data to accommodate a respective handoff of the mobile communication device 120-1. In such an instance, appropriate cache data associated with a wireless communication link can be forwarded to the new wireless access point to perform a respective handoff.

Note that it is possible that the wireless access point 105-2 denies the request by the mobile communication device 120-1 to perform a respective handoff of a communication link. In such an instance, the mobile communication device 120-1 can be configured to communicate with the next best wireless access point option in the prioritized filtered neighbor list 670 to perform the handoff. The next best option in this example is option #2 or wireless access point 105-6. To initiate a handoff, the mobile communication device 120-1 communicates with the wireless access point 105-6. If the wireless access point 105-6 accepts the request for handoff, the mobile communication device 120-1 establishes a wireless communication link with the wireless access point 105-6 and then terminates the previous wireless communication link between the mobile communication device 120-1 and the wireless access point 105-1.

Figure 7:
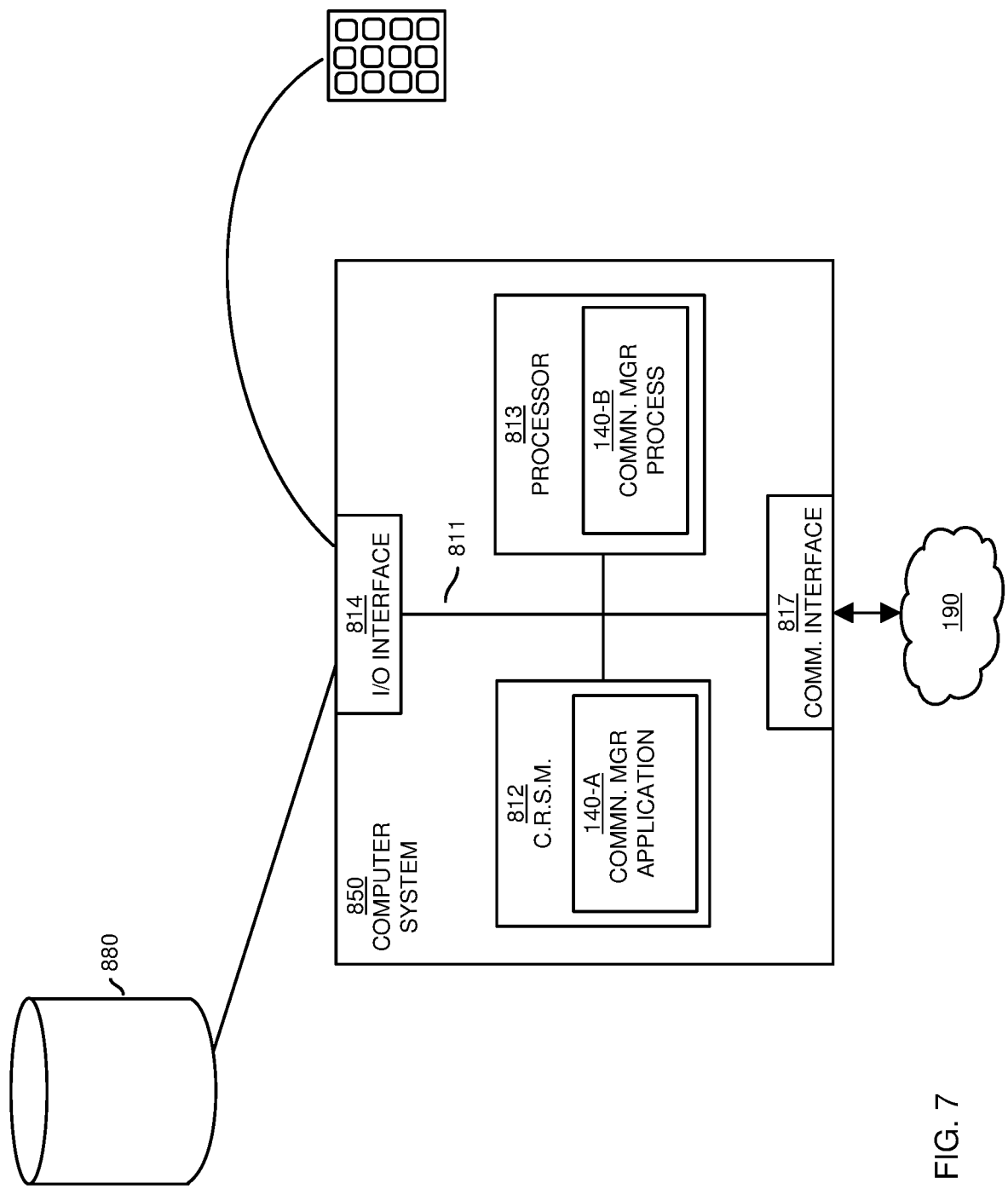
FIG. 7 is a diagram illustrating an example computer architecture in which to execute any functionality according to embodiments herein.

FIG. 7 is an example block diagram of a computer device for implementing any of the operations as discussed herein according to embodiments herein.

In one embodiment, one or more computers (such as wireless access point) implement the communication manager resource 140 (communication manager 140-1 and/or communication manager 140-2) and corresponding operations as discussed herein.

As shown, computer system 850 of the present example includes an interconnect 811, a processor 813 (such as one or more processor devices, computer processor hardware, etc.), computer readable storage medium 812 (such as hardware storage to store instructions, data, information, etc.), I/O interface 814, and communications interface 817.

Interconnect 811 provides connectivity amongst processor 813, computer readable storage media 812, I/O interface 814, and communication interface 817.

I/O interface 814 provides connectivity to a repository 880 and, if present, other devices such as a playback device, display screen, input resources, a computer mouse, etc.

Computer readable storage medium 812 (such as a non-transitory hardware medium) can be any suitable hardware storage resource or device such as memory, optical storage, hard drive, rotating disk, etc. In one embodiment, the computer readable storage medium 812 stores instructions executed by processor 813.

Communications interface 817 enables the computer system 850 and processor 813 to communicate over a resource such as network 190 to retrieve information from remote sources and communicate with other computers. I/O interface 814 enables processor 813 executing communication manager application 140-1 to retrieve stored information such as from repository 880.

As shown, computer readable storage media 812 is encoded with communication manager application 140-A (e.g., software, firmware, etc.) executed by processor 813 (hardware). Communication manager application 140-A can reside in any suitable hardware such as in controller resource 150, the wireless access point 105-1, etc., and be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in the communication manager application 140-A stored on computer readable storage medium 812.

Execution of the communication manager application 140-A produces processing functionality such as communication manager process 140-B in processor 813. In other words, the communication manager process 140-2 associated with processor 813 represents one or more aspects of executing communication manager application 140-A within or upon the processor 813 in the computer system 850.

Those skilled in the art will understand that the computer system 850 can include other processes and/or software and hardware components, such as an operating system that controls allocation and use of hardware resources to execute communication manager application 140-A.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 and its parts may reside at any of one or more locations or can be included in any suitable one or more resource in network environment 100 to implement functionality as discussed herein.

Functionality supported by the different resources will now be discussed via flowcharts in FIGS. 8 and 9. Note that the steps in the flowcharts below can be executed in any suitable order.

Figure 8:
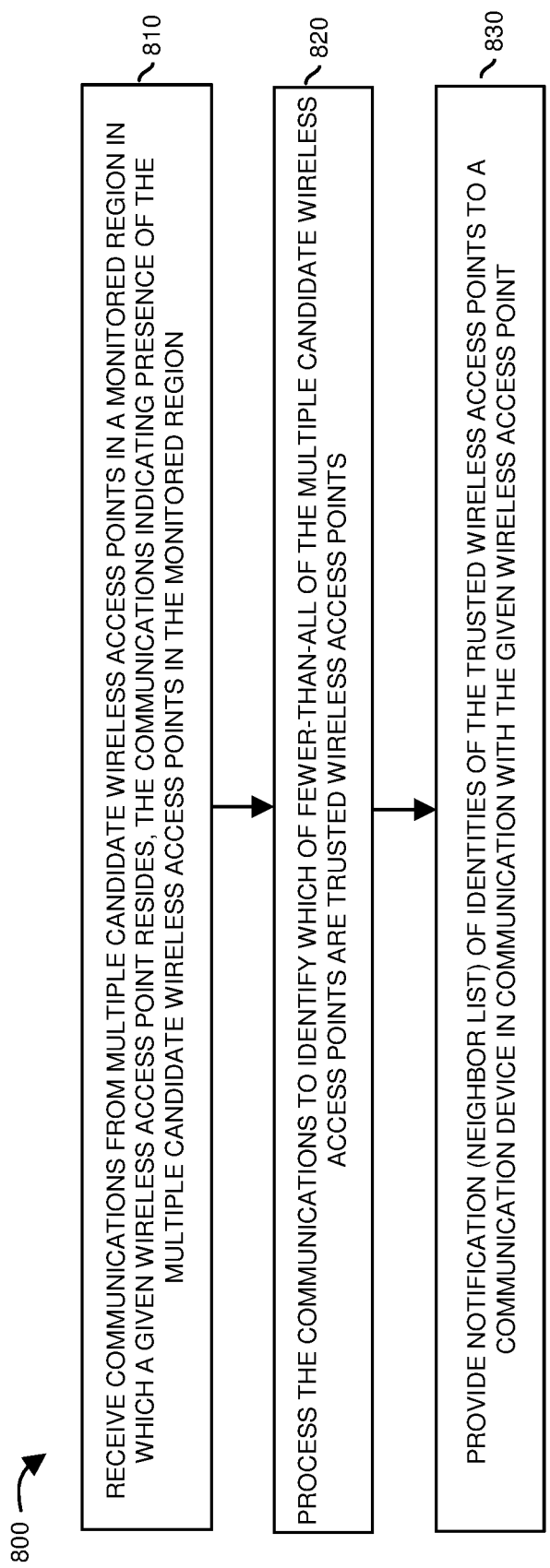
FIGS. 8 and 9 are example diagrams illustrating methods according to embodiments herein.

FIG. 8 is a flowchart 800 illustrating an example method according to embodiments. Note that there will be some overlap with respect to concepts as discussed above.

In processing block 810, the wireless access point 105-1 receives communications from multiple candidate wireless access points in a monitored region in which the wireless access point 105-1 resides. In one embodiment, the received communications from the candidate wireless access points indicate presence of the multiple candidate wireless access points in the monitored region.

In processing block 820, communication manager 140-2 (or other suitable resource) processes the received communications to identify which of fewer-than-all of the multiple candidate wireless access points are trusted wireless access points.

In processing block 830, the wireless access point 105-1 provides notification (such as prioritized filtered neighbor list 670) of identities of the trusted wireless access points to communication device 120-1. As previously discussed, the mobile communication device 120-1 then initiates a handoff to a trusted wireless access point in the filtered neighbor list.

Figure 9:
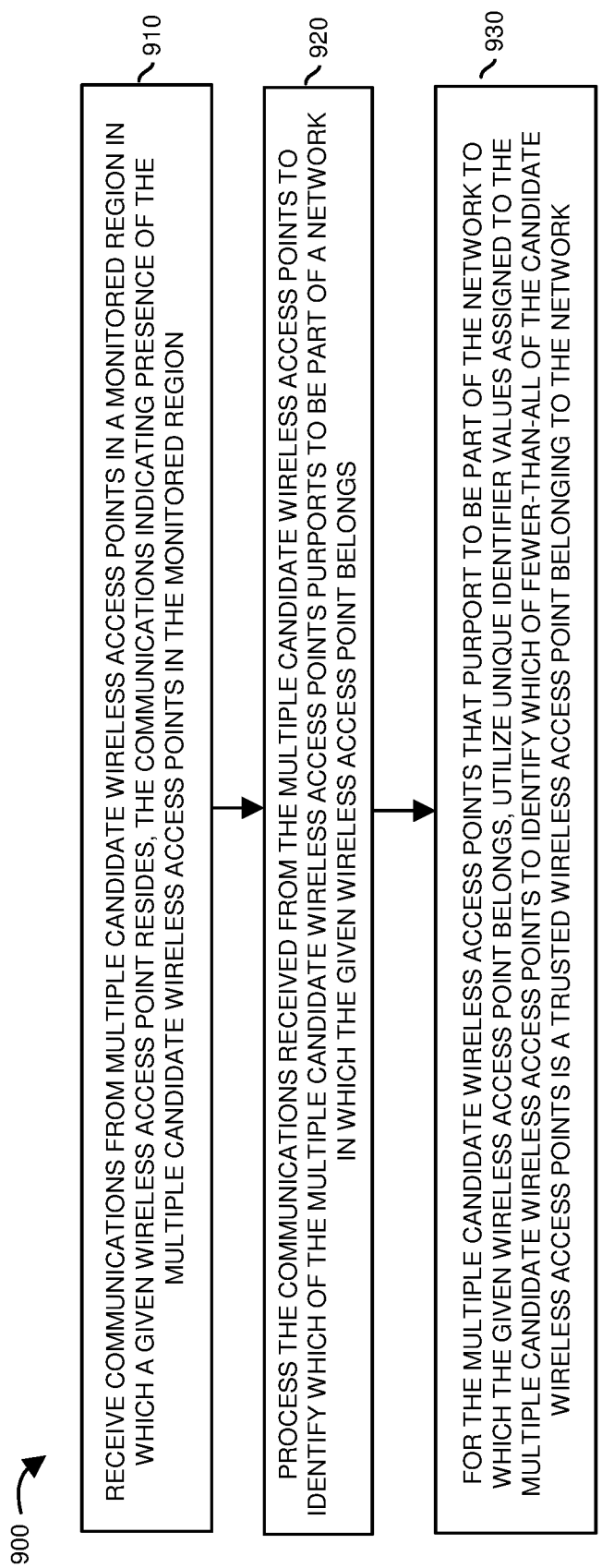

FIG. 9 is a flowchart 900 illustrating an example method according to embodiments. Note that there will be some overlap with respect to concepts as discussed above.

In processing block 910, the wireless access point 105-1 receives communications from multiple candidate wireless access points in a monitored region in which the wireless access point 105-1 resides. The communications indicate presence of the multiple candidate wireless access points in the monitored region.

In processing block 920, a communication manager processes the communications received from the multiple candidate wireless access points to identify which of the multiple candidate wireless access points purports to be part of a network in which the given wireless access point belongs.

In processing block 930, for the multiple candidate wireless access points that purport to be part of the network to which the given wireless access point belongs, the communication manager utilizes unique identifier values assigned to the multiple candidate wireless access points to identify which of the fewer-than-all candidate wireless access points is a trusted wireless access point belonging to the network.

Note again that techniques herein are well suited to provide more efficient use of available wireless spectrum in wireless handoffs. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While one or more inventions have been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving wireless access point information indicating a group of multiple candidate wireless access points present in a monitored region in which a given wireless access point resides;
from the wireless access point information, identifying a set of candidate wireless access points in the group that are trusted wireless access points in which to handoff a wireless connection from the given wireless access point; and
providing notification of identities of the trusted wireless access points in the set to a communication device in communication with the given wireless access point over the wireless connection.

2. The method as in claim 1 further comprising:
filtering at least one of the multiple candidate wireless access points from the group to produce the set of wireless access points that are trusted.

3. The method as in claim 1, wherein each of the candidate wireless access points in the group purports to be part of a service provider network to which the given wireless access point belongs, the method further comprising:
receiving unique identifier values assigned to the multiple candidate wireless access points in the group; and
based on the unique identifier values, identifying which of the multiple candidate wireless access points are trusted wireless access points that actually belong to the service provider network.

4. The method as in claim 1, wherein receiving the wireless access point information includes: at the given wireless access point, receiving a communication from each of the multiple candidate wireless access points, each received communication from a corresponding wireless access point indicating that the corresponding wireless access point belongs to a service provider network in which the given wireless access point belongs.

5. The method as in claim 1, wherein identifying the set of candidate wireless access points in the group that are trusted includes:
receiving unique identifier values assigned to the multiple candidate wireless access points in the group; and
forwarding the unique identifier values received from the candidate wireless access points in the monitored region to a communication management resource in communication with the given wireless access point, the communication management resource identifying which of the candidate wireless access points are trusted wireless access points.

6. The method as in claim 1, wherein receiving the wireless access point information includes:
receiving a respective communication from each of the multiple candidate wireless access points.

7. The method as in claim 1, wherein identifying the set of candidate wireless access points in the group that are trusted wireless access points includes:
processing received communications from the multiple candidate wireless access points to identify which of the multiple candidate wireless access points is part of a service provider network to which the given wireless access point belongs.

8. The method as in claim 1, wherein receiving the wireless access point information includes:
receiving a respective network name from each of the multiple candidate wireless access points in the group; and
receiving a network address from each of the multiple candidate wireless access points in the group.

9. The method as in claim 8, wherein identifying the set of candidate wireless access points in the group that are trusted wireless access points includes:
processing network names received from the multiple candidate wireless access points in the set to identify which of the multiple candidate wireless access points purports to be part of a network in which the given wireless access point belongs; and
forwarding network addresses of the multiple candidate wireless access points purporting to be part of the network to a network controller resource, the network controller resource utilizing the BSSIDs to determine which of the multiple candidate wireless access points is a trusted wireless access point for use by the communication device.

10. The method as in claim 1, wherein providing the notification of identities of the trusted wireless access points in the set to the communication device includes: providing a ranking of the identities of the trusted wireless access points in the set based at least in part on respective received signal strength of communications received from each of the trusted wireless access points in the set.

11. The method as in claim 1, wherein the trusted wireless access points and the given wireless access point are assigned a same network name.

12. The method as in claim 11, wherein providing notification of identities of the trusted wireless access points to the communication device includes:
providing notification to the communication device that the trusted wireless access points are assigned the same network name as the given wireless access point.

13. The method as in claim 12, wherein the identities of the trusted wireless access points includes a first identity and a second identity, the first identity assigned to a first wireless access point of the multiple wireless access points, the second identity assigned to a second wireless access point of the multiple wireless access points, the method further comprising:
producing the notification to indicate an ordering of the first identity and the second identity, the notification indicating that the second wireless access point is better suited to support wireless communications with the communication device than the first wireless access point.

14. The method as in claim 13 further comprising:
identifying a first direction from which wireless communications are received at the given wireless access point from the first wireless access point;
identifying a second direction from which wireless communications are received at the given wireless access point from the second wireless access point;
identifying a third direction from which wireless communications are received at the given wireless access point from the communication device; and
determining the ordering based at least in part on a combination of the first direction, the second direction, and the third direction.

15. The method as in claim 13 further comprising:
identifying a first direction from which first wireless communications are received from the first wireless access point;
detecting a first signal strength of the first wireless communications received from the first wireless access point;

identifying a second direction from which second wireless communications are received from the second wireless access point;
detecting a second signal strength of the second wireless communications received from the second wireless access point;
identifying a third direction from which third wireless communications are received from the communication device; and
determining the ordering based on the combination of the first direction, the second direction, the third direction, the first signal strength, and the second signal strength.

16. The method as in claim 1 further comprising
ranking the trusted wireless access points in the notification at least in part depending upon both the signal strength of and a direction with respect to the given wireless access point from which the communications are received from the trusted wireless access points.

17. A system comprising:
a communication management resource operable to:
receive wireless access point information indicating a group of multiple candidate wireless access points present in a monitored region in which a first wireless access point resides;
from the wireless access point information, identify a set of candidate wireless access points in the group that are trusted wireless access points in which to handoff a wireless connection from the first wireless access point; and
provide notification of identities of the trusted wireless access points in the set to a communication device in communication with the first wireless access point over the wireless connection.

18. The system as in claim 17, wherein the communication management resource is further operable to:
filter at least one of the multiple candidate wireless access points from the group to produce the set of wireless access points.

19. The system as in claim 17, wherein each of the candidate wireless access points in the group purports to be part of a service provider network to which the first wireless access point belongs, the communication management resource further operable to:
receive unique identifier values assigned to the multiple candidate wireless access points in the group; and
based on the unique identifier values, identify which of the multiple candidate wireless access points in the group are trusted wireless access points belonging to the service provider network.

20. The system as in claim 17, wherein the communication management resource is further operable to:
at the first wireless access point, receive a communication from each of the multiple candidate wireless access points, each received communication from a corresponding wireless access point indicating that the corresponding wireless access point belongs to the service provider network.

21. The system as in claim 17, wherein the communication management resource is further operable to:
receive unique identifier values assigned to the multiple candidate wireless access points in the group; and
forward the unique identifier values received from the candidate wireless access points in the monitored region to a remote resource in communication with the first wireless access point, the remote resource identifying which of the multiple candidate wireless access points in the group are trusted wireless access points.

22. The system as in claim 17, wherein the communication management resource is further operable to:
receive the wireless access point information from the multiple candidate wireless access points.

23. The system as in claim 22, wherein the communication management resource is further operable to:
process the received wireless access point information from the multiple candidate wireless access points; and
from the processing, identify which of the multiple candidate wireless access points purports to be part of a network in which the first wireless access point belongs.

24. The system as in claim 17, wherein the communication management resource is further operable to:
receive a network name from each of the multiple candidate wireless access points in the group; and
receive a network address from each of the multiple candidate wireless access points in the group.

25. The system as in claim 17, wherein the communication management resource is further operable to:
forward network addresses of the multiple candidate wireless access points in the group purporting to be part of a service provider network to which the first wireless access point belongs to a remote communication management resource, the remote communication management resource utilizing the network addresses to determine which of the multiple candidate wireless access points in the group is a trusted wireless access point for use by the communication device.

26. The system as in claim 17, wherein the communication management resource is further operable to:
rank identities of the trusted wireless access points in the set based at least in part on respective received signal strengths of communications received from the trusted wireless access points in the set.

27. Computer-readable storage hardware having instructions stored thereon, the instructions, when carried out by computer processor hardware, causes the computer processor hardware to:
receive wireless access point information indicating a group of multiple candidate wireless access points present in a monitored region in which a first wireless access point resides;
from the wireless access point information, identify a set of candidate wireless access points in the group that belong to a service provider network in which the first wireless access point belongs; and
provide notification of identities of the trusted wireless access points in the set to a communication device in communication with the first wireless access point over a wireless connection, the notification indicating the identities of the trusted wireless access points in the set in which to handoff the communication device from the first wireless access point.

* * * * *